US011086670B2

(12) United States Patent
McSchooler (10) Patent No.: US 11,086,670 B2
(45) Date of Patent: Aug. 10, 2021

(54) PLATOONING OF COMPUTATIONAL RESOURCES IN AUTOMATED VEHICLES NETWORKS

(71) Applicant: DISH Network L.L.C., Englewood, CO (US)

(72) Inventor: Jeff McSchooler, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 116 days.

(21) Appl. No.: 16/600,663

(22) Filed: Oct. 14, 2019

(65) Prior Publication Data

US 2020/0201674 A1 Jun. 25, 2020

Related U.S. Application Data

(60) Provisional application No. 62/783,145, filed on Dec. 20, 2018.

(51) Int. Cl.
*G06F 15/16* (2006.01)
*G06F 9/48* (2006.01)
(Continued)

(52) U.S. Cl.
CPC ......... *G06F 9/4881* (2013.01); *G05D 1/0027* (2013.01); *G05D 1/0088* (2013.01);
(Continued)

(58) Field of Classification Search
CPC ........ G06F 9/4881; H04L 67/12; H04W 4/46; H04W 84/18
See application file for complete search history.

(56) References Cited

U.S. PATENT DOCUMENTS

| 7,945,470 B1* | 5/2011 | Cohen | G06Q 10/06 |
| | | | 705/7.13 |
| 2002/0128001 A1* | 9/2002 | Shuttleworth | G06F 9/542 |
| | | | 455/414.1 |

(Continued)

FOREIGN PATENT DOCUMENTS

WO 2018/125686 A2 7/2018

OTHER PUBLICATIONS

International Search Report and Written Opinion for PCT/US2019/065318 dated May 13, 2020, all pages.

*Primary Examiner* — Padma Mundur
(74) *Attorney, Agent, or Firm* — Kilpatrick Townsend & Stockton LLP (57) ABSTRACT

Novel techniques are described for platooning of computational resources in automated vehicle networks. An on-board computational processor of an automated vehicle typically performs a large number of computational tasks, and some of those computational tasks can be computationally intensive. Some such tasks, referred to as platoonable tasks herein, are well-suited for parallel processing by multiple processors. Embodiments can detect one or more on-board computational processors in one or more automated vehicles that are likely, during the time window in which the platoonable task will be executed, to have available computational resources and to be traveling along respective paths that are close enough to each other to allow for ad hoc network communications to be established between the processors. In response to detecting such cases, embodiments can schedule and instruct shared execution of the platoonable tasks by the multiple processors via the ad hoc network.

20 Claims, 4 Drawing Sheets

(51) Int. Cl.
*H04L 29/08* (2006.01)
*H04W 4/46* (2018.01)
*G06F 15/173* (2006.01)
*G05D 1/02* (2020.01)
*G05D 1/00* (2006.01)
*G07C 5/08* (2006.01)
*H04W 84/18* (2009.01)

(52) U.S. Cl.
CPC ..... *G05D 1/0293* (2013.01); *G06F 15/17368* (2013.01); *G07C 5/0808* (2013.01); *H04L 67/12* (2013.01); *H04W 4/46* (2018.02); *G05D 2201/0213* (2013.01); *H04W 84/18* (2013.01)

(56) References Cited

U.S. PATENT DOCUMENTS

| | | | |
|---|---|---|---|
| 2008/0300026 A1* | 12/2008 | Ban | G06F 9/5027 455/572 |
| 2011/0131584 A1* | 6/2011 | Wang | H04L 67/10 718/104 |
| 2012/0221886 A1* | 8/2012 | Bareness | G06F 9/5027 714/4.2 |
| 2018/0059684 A1 | 3/2018 | Hadfield et al. | |
| 2019/0364492 A1* | 11/2019 | Azizi | H04W 52/0264 |

* cited by examiner

PLATOONING OF COMPUTATIONAL RESOURCES IN AUTOMATED VEHICLES NETWORKS

FIELD

This invention relates generally to automated vehicles, and, more particularly, to platooning of computational resources in automated vehicles networks.

BACKGROUND

Traversing of roadways and other environments by automated vehicles, including both partially and fully autonomous vehicles, can involve automation of a large number of processes involving a number of complex computational tasks. Some such tasks can involve receiving and processing large amounts of sensor data from multiple types of sensors, such as from position sensors (e.g., global positioning satellite (GPS) devices), radar sensors, infrared (IR) sensors, cameras, proximity sensors, and others. Other such tasks can involve controlling, and processing feedback relating to, braking, accelerating, steering, and other driving functions. Still other such tasks can involve detecting and responding to traffic events, such as traffic accidents, roadway damage, roadway obstructions, slow-downs, and the like. And other such tasks can involve power management functions, climate control functions, vehicle health check functions, passenger interface functions, and many other functions. Even with sophisticated on-board processors and other components, it may be impractical, overwhelming, inefficient, or otherwise undesirable for a particular automated vehicle to handle all its complex computational tasks on its own.

BRIEF SUMMARY

Among other things, embodiments provide novel systems and methods for platooning of computational resources in automated vehicle networks. An on-board computational processor of an automated vehicle typically performs a large number of computational tasks, and some of those computational tasks can be computationally intensive (e.g., involving processing and analyzing of data from multiple sensors, and directing multiple feedback control systems, accordingly). Some such tasks, referred to as platoonable tasks herein, are well-suited for parallel processing by multiple processors (e.g., executable as multiple threads, etc.). Embodiments can detect one or more on-board computational processors in one or more automated vehicles that are likely, during the time window in which the platoonable task will be executed, to have available computational resources and to be traveling along respective paths that are close enough to each other to allow for ad hoc network communications to be established between the processors. In response to detecting such cases, embodiments can schedule and instruct shared execution of the platoonable tasks by the multiple processors via the ad hoc network.

According to one set of embodiments, a system is provided for platooning of computational resources in automated vehicle networks. The system includes a vehicle tracer and a platooning processor. The vehicle tracker is to: determine a first travel path along which a first automated vehicle of a plurality of automated vehicles is predicted to travel during a time window, the first automated vehicle having a first computational processor disposed therein; and identify a second automated vehicle of the plurality of automated vehicles as having a second computational processor disposed therein, and as predicted to travel along a second travel path during at least a portion of the time window so as to be in ad hoc networking range of the first computational processor during at least the portion of the time window. The platooning processor is to: detect a platoonable task as one of a plurality of computational tasks predicted to consume at least a threshold amount of computational resources of the first computational processor during the time window; determine that the second computational processor is predicted to have available computational resources during at least the portion of the time window; schedule platooning of computational resources of the first computational processor and the second computational processor to perform the platoonable task; and instruct performance of the platoonable task by the first computational processor and the second computational processor in accordance with the scheduling.

According to another set of embodiments, a method is provided for platooning of computational resources in automated vehicle networks. The method includes: detecting, by a first computational processor disposed in a first automated vehicle, a platoonable task as one of a plurality of computational tasks predicted to consume at least a threshold amount of computational resources of the first computational processor during a time window; determining a first travel path along which the first automated vehicle is predicted to travel during the time window; identifying a second computational processor as being located in an associated automated vehicle predicted to travel along a second travel path during at least a portion of the time window so as to be in ad hoc networking range of the first computational processor during at least the portion of the time window, and as predicted to have available computational resources during at least the portion of the time window; scheduling platooning of computational resources of the first computational processor and the second computational processor to perform the platoonable task; and instructing performance of the platoonable task by the first computational processor and the second computational processor in accordance with the scheduling.

According to another set of embodiments, a system is provided for platooning of computational resources in automated vehicle networks. The system includes: a network interface to couple with an ad hoc automated vehicle network; one or more processors; and non-transient memory having, stored thereon, instructions, which, when executed, cause the one or more processors to perform steps. The steps include: detecting a platoonable task as one of a plurality of computational tasks predicted to consume at least a threshold amount of computational resources of a first computational processor during a time window, the first computational processor disposed in a first automated vehicle; determining a first travel path along which the first automated vehicle is predicted to travel during the time window; identifying a second computational processor as being located in an associated automated vehicle predicted to travel along a second travel path during at least a portion of the time window so as to be in ad hoc networking range of the first computational processor during at least the portion of the time window, and as predicted to have available computational resources during at least the portion of the time window; scheduling platooning of computational resources of the first computational processor and the second computational processor to perform the platoonable task; and instructing performance, via the ad hoc automated vehicle network, of the platoonable task by the first computational processor and the second computational processor in accordance with the scheduling.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Traversing of roadways and other environments by automated vehicles, including both partially and fully autonomous vehicles, can involve automation of a large number of processes involving a number of complex computational tasks. Such tasks can involve receiving and processing large amounts of sensor data, controlling driving functions, detecting and responding to traffic events, controlling power management functions, handling passenger interface events, and/or any of a wide variety of other vehicle-related functions. Even with sophisticated on-board processors and other components, it may be impractical, overwhelming, inefficient, or otherwise undesirable for a particular automated vehicle to handle all its complex computational tasks on its own.

Some approaches can involve off-loading certain computational tasks to one or more remote servers (e.g., to a cloud-based server). Such an approach can be effective for certain tasks in certain environments, but such an approach can have limitations. One limitation is the reliance on availability of a stable remote network connection with the one or more remote servers (e.g., particular networks may not be available to all autonomous vehicles wherever and whenever connections with those networks are desired). Another limitation is that too much overhead, too much latency, and/or other factors can, at times, frustrate the effectiveness of such off-loading.

Embodiments described herein involve novel techniques for relieving an automated vehicle's computational load by exploiting dynamically formed automated vehicles networks to platoon computational resources. For example, a first computational processor on-board a first automated vehicle can detect one or more scheduled computational processes predicted to consume appreciable local processing resources over some time window. In response, a determination can be made as to one or more other computational processors on-board one or more other automated vehicles that are computationally platoonable (e.g., over at least a portion of the time window, having available excess computational resources and being in, or within range of, an ad hoc communications network with the first computational processor). In accordance with the detecting, the one or more other computational processors can be computationally platooned with the first computational processor for at least a portion of the time window.

Figure 1:
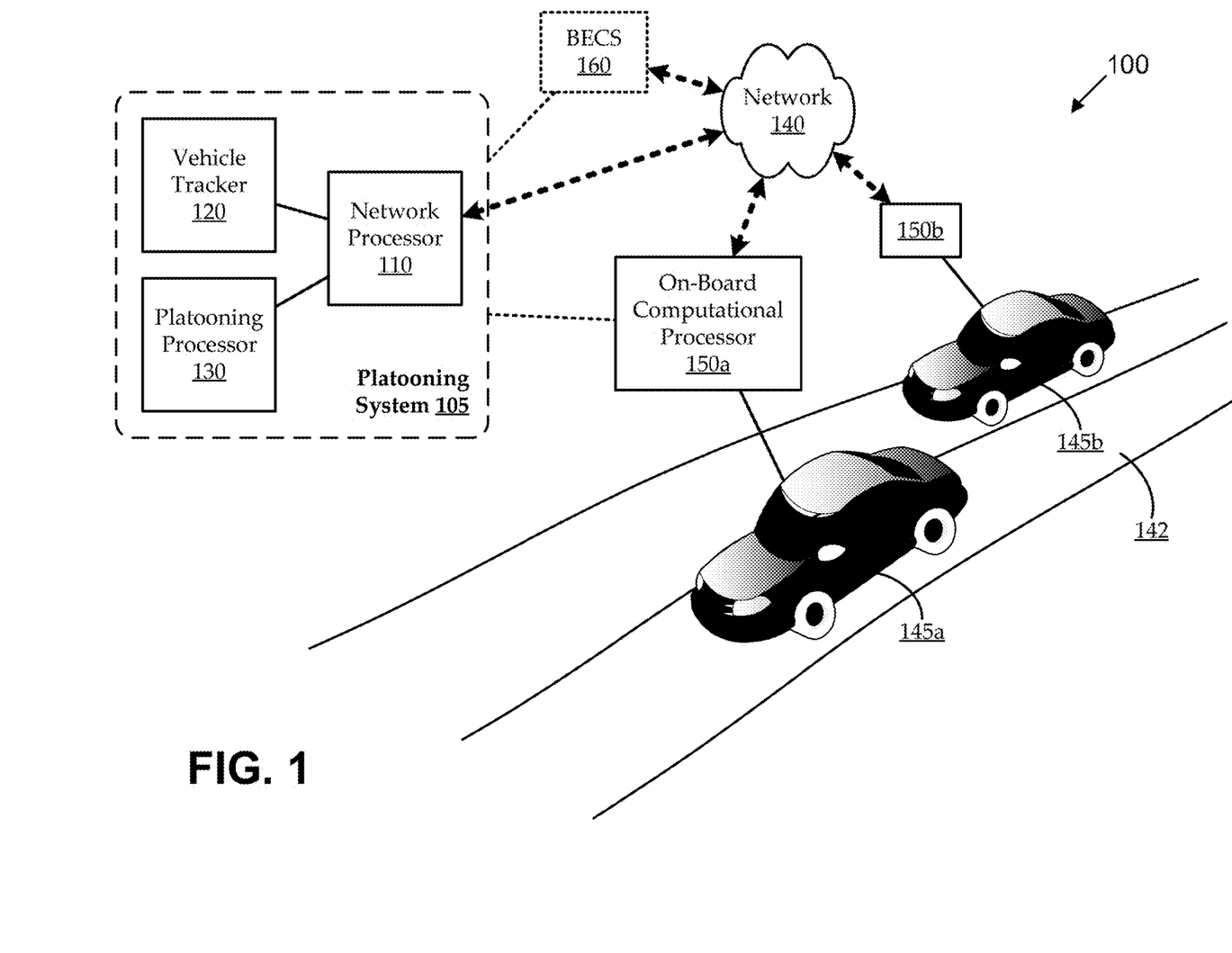
FIG. 1 shows a network environment as a context for various embodiments.

Turning to FIG. 1, a network environment 100 is shown as a context for various embodiments. The network environment 100 includes multiple automated vehicles 145 traveling on a roadway 142. The automated vehicles 145 can include any partially or fully autonomous vehicles that travel along with other vehicles (e.g., automated and/or non-automated). For example, automated vehicles 145 can include automated cars, buses, trucks, trams, utility vehicles, maintenance vehicles, construction vehicles, public transit vehicles, etc. In general, automated vehicles 145 include various sensors and automated controls (including automated driving controls) by which a computational system can direct the travel (e.g., direction, speed, path, etc.) of the vehicle fully or partly without human intervention.

At any particular time, some or all of the automated vehicles 145 are in wireless communication with each other, and/or with other systems, via one or more communication networks 140. The communication network(s) 140 can include any other suitable type of network by which wireless communication links can be established directly or indirectly between the automated vehicles 145. In some embodiments, some or all automated vehicles 145 include antennas and transceivers by which to communicate with nearby cellular towers, with one or more satellites, with one or more nearby relay stations, and/or with any other infrastructure that can send and receive wireless communications. The infrastructure can be in further communication with one or more other networks, such as with the Internet and/or any other public and/or private networks, cellular networks, satellite networks, cable networks, fiber-optic networks, backhaul networks, etc. In some embodiments, the communication network(s) 140 can include wireless ad hoc networks. The one or more wireless ad hoc networks can be implemented in any suitable manner that enables a dynamically changing set of nodes (i.e., including at least some of the automated vehicles 145) to self-configure wireless communications with each other, as needed. For example, as automated vehicles 145 change position relative to each other, each can autonomously determine which wireless links to form, shed, heal, etc. with other automated vehicles 145; which network traffic to route, in which ways to route the traffic, and which protocols to use for routing (e.g., each automated vehicle 145 potentially acting as a router in various communication transactions); etc. In some such embodiments, the ad hoc network(s) can dynamically form as peer-to-peer networks based on proximity. For example, a particular automated vehicle 145 can dynamically and automatically negotiate wireless connectivity with all compatible automated vehicles 145 within a particular geographic region.

Each of the automated vehicles 145 includes an on-board computational processor (OBCP) 150, which can include one or more processor devices and one or more memory devices, such as non-transient processor-readable memory devices. In some embodiments, each OBCP 150 includes a network interface (e.g., including any suitable antennas, transceivers, etc.) by which the automated vehicle 145 having the OBCP 150 can communicate with the communication network(s) 140. Some embodiments of the network environment 100 also include one or more back-end computational systems 160, which can be communicatively coupled with one or more of the communication network(s) 140. For example, the one or more back-end computational systems 160 can be in communication with one or more OBCPs 150 of one or more automated vehicles 145 via the communication network(s) 140. The back-end computational system(s) 160 can be implemented as one or more server computer, or the like, that is in accessible via the communication network(s) 140 and may or may not be distributed across multiple locations and/or physical computational devices. For example, the back-end computational system(s) 160 can be a cloud-based server having suitable processing and storage capacity (e.g., fixed or dynamic) for executing suitable applications, as described herein.

As illustrated, the environment 100 includes a platooning system 105. Embodiments of the platooning system 105 can include a vehicle tracker 120 and a platooning processor 130. Some embodiments can also include a network processor 110. In some implementations, the platooning system 105 is implemented by the OBCP 150. For example, each of some or all of the automated vehicles 145 can have a respective instance of the platooning system 105 implemented by its local OBCP 150. In other implementations, the platooning system 105 is accessible to one or more OBCPs 150 of one or more automated vehicles 145 via the communication network(s) 140. In such implementations, the platooning system 105 can be implemented by the one or more back-end computational systems 160.

Embodiments of the vehicle tracker 120 can determine a first travel path along which a first automated vehicle 145a of multiple automated vehicles 145 is predicted to travel during a time window. As illustrated, the first automated vehicle 145a can have a first computational processor (a first OBCP 150a). The vehicle tracker 120 can identify a second automated vehicle 145b as having a second computational processor (a second OBCP 150b). The vehicle tracker 120 can further identify the second automated vehicle 145b as predicted to travel along a second travel path during at least a portion of the time window so as to be in ad hoc networking range of the first OBCP 150a during at least the portion of the time window. As illustrated in FIG. 1, in some cases, the first and second OBCPs 150 are in two separate automated vehicles 145. For example, the first OBCP 150a is in a first automated vehicle 145a traveling along a first travel path, and the second OBCP 150b is in a second automated vehicle 145b that is different than the first automated vehicle 145a and traveling along a second travel path that is different than the first travel path. In such cases, though the travel paths are different, the vehicle tracker 120 can identify that the first and second travel paths are at least partially the same (e.g., share a roadway for a portion of their travel path), or are close enough along a portion of their respective routes (e.g., on nearby roadways) that the automated vehicles 145 are predicted to be in ad hoc networking range during at least the portion of the time window. Alternatively, the vehicle tracker 120 can determine that one or both automated vehicles 145 can reach its destination using any of multiple candidate travel paths, and the vehicle tracker 120 can determine whether any of the multiple candidate travel paths would result in the automated vehicles 145 being predicted to be in ad hoc networking range during at least the portion of the time window. If so, embodiments can instruct one or both of the automated vehicles 145 as to which candidate travel path to travers, thereby contributing to creating a situation in which the automated vehicles 145 are predicted to be in ad hoc networking range during at least the portion of the time window.

In some cases, one or more OBCPs 150 can be part of mobile devices, and/or otherwise separable from (e.g., not structurally integrated with) a particular automated vehicle 145. According to such implementations, the first and second OBCPs 150 correspond to respective users (e.g., individual human users), rather than to respective automated vehicles 145; such that the multiple OBCPs 150 may move among multiple automated vehicles 145 and/or may even be in a same vehicle for some time. For example, the first OBCP 150a can be integrated in an automated vehicle 145, and the second OBCP 150b can be in a tablet computer of a passenger of the automated vehicle 145 (i.e., it is "on board" at least during a time window of interest).

Embodiments of the platooning processor 130 can detect a platoonable task as one of multiple computational tasks predicted to consume at least a threshold amount of computational resources of the first OBCP 150a during the time window. For example, the platooning processor 130 can compute a computational resource demand for the time window according to an amount of the computational resources of the first OBCP 150a predicted to be consumed by the multiple computational tasks during the time window, and the platooning processor 130 can compute a computational resource supply for the time window according to an amount of the computational resources of the first OBCP 150a predicted to be available for consumption by the multiple computational tasks during the time window. The platooning processor 130 can the detect the platoonable task responsive to determining that the computational resource demand for the time window exceeds the computational resource supply for the time window.

Embodiments of the platooning processor 130 can determine (e.g., responsive to detecting the platoonable task) that the second OBCP 150b is predicted to have available computational resources during at least the portion of the time window. In some embodiments, the vehicle tracker 120 identifies a set of candidate OBCPs 150 as each being associated with a respective automated vehicle 145 (e.g., in the first automated vehicle 145a, the second automated vehicle 145b, and/or other automated vehicles 145) predicted to travel along a respective travel path during at least the portion of the time window so as to be in ad hoc networking range of the first OBCP 150a during at least the portion of the time window. The platooning processor 130 can then identify the second OBCP 150b as being one of the set of candidate OBCPs 150 predicted to have available computational resources during at least the portion of the time window. The platooning processor 130 can then schedule platooning of computational resources of the first OBCP 150a and the second OBCP 150b to perform the platoonable task. In accordance with the scheduling, the platooning processor 130 can instruct performance of the platoonable task by the first OBCP 150a and the second OBCP 150b. In some implementations, the platoonable task is executable as a plurality of parallel execution threads; and the platooning processor 130 can schedule the platooning by scheduling a first portion of the plurality of parallel execution threads to be executed by the first OBCP 150a, and scheduling a second portion of the plurality of parallel execution threads to be executed by the second OBCP 150b.

Embodiments of the network processor 110 can communicatively couple, via an ad hoc network (one of the communication network(s) 140), with any of the plurality of automated vehicles in wireless ad hoc networking range of the ad hoc network. The ad hoc network can have a set of member nodes that dynamically changes in accordance with which of multiple antennas (wireless ad hoc network-compatible antennas) is in proximity to at least another of the antennas that presently corresponds to a member node of the ad hoc network. For example, the ad hoc network can dynamically generate peer-to-peer networks, mesh networks, and/or other suitable networks using one or more hops between member nodes. In some embodiments, the instructing, by the platooning processor 130, of performance of the platoonable task can involve (or trigger) communication of instructions, via the communication network(s) 140 by the network processor 110, to at least one of the first OBCP 150a or the second OBCP 150b via the ad hoc network in accordance with the instructing. According to some embodiments, each OBCP 150 includes a respective antenna to establish wireless connectivity with the ad hoc network, such that each respective OBCP 150 can effectively communicate with (or be instructed via) the ad hoc network.

In some embodiments, the network processor 110 is further to detect ad hoc network connectivity between the first OBCP 150a and the second OBCP 150b in accordance with the time window. In some such embodiments, the platooning processor 130 can instruct the performance of the platoonable task responsive to the network processor 110 detecting the ad hoc network connectivity. For example, suppose a first automated vehicle 145a and a second automated vehicle 145b are traveling along their respective paths. At some point (i.e., during a portion of the time window), the automated vehicles 145 are in close enough proximity to one another, so that an ad hoc wireless network connection can be established between the first and second automated vehicles 145. In some implementations, the scheduling by the platooning processor 130 is accurate enough (e.g., because vehicle tracking by the vehicle tracker 120 is accurate enough), such that the platooning processor 130 can instruct the performance of the platoonable task by the first and second OBCPs 150 responsive only to pre-scheduled timing based on the prediction of where the automated vehicles 145 at what times. In other implementations, the scheduling by the platooning processor 130 prepares the task scheduling to be executed in response to detecting that the wireless ad hoc network connection between the automated vehicles 145 has been established. In some implementations, detecting establishment of the network connection can include detecting that there is at least a minimum threshold link quality (e.g., a minimum quality of service over the link, a minimum bandwidth, a minimum data rate, a maximum packet error loss, etc.).

Figure 2:
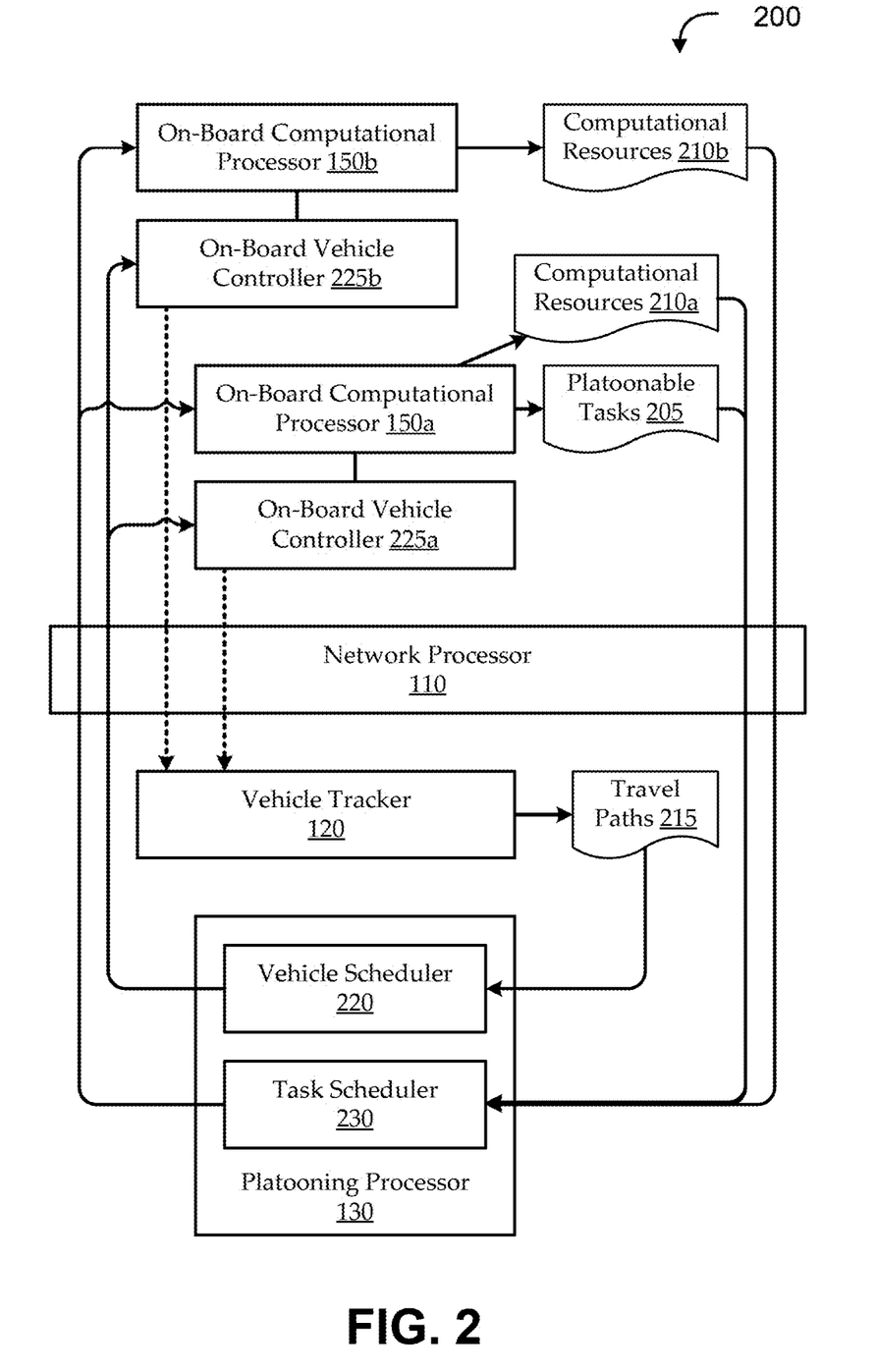
FIG. 2 shows an illustrative architecture for a platooning system, according to various embodiments.

FIG. 2 shows an illustrative architecture for a platooning system 200, according to various embodiments. The platooning system 200 can be an implementation of the platooning system 105 of FIG. 1. As illustrated, the platooning system 200 includes illustrative implementations of a network processor 110, a vehicle tracker 120, and a platooning processor 130. In the illustrated context, there is a first OBCP 150a having first, dynamically changing computational resources 210a, and a second OBCP 150b having second, dynamically changing computational resources 210b. Each OBCP 150 can include, or be in communication with, a respective on-board vehicle controller 225. Each on-board vehicle controller 225 can control, or assist with the control of, vehicle functions of a respective automated vehicle 145. For example, the on-board vehicle controller 225 can control or assist with steering, braking and acceleration, navigation, etc.

In some embodiments, the first OBCP 150a can detect a platoonable task 205 as one of multiple computational tasks predicted to consume at least a threshold amount of the computational resources 210a of the first OBCP 150a during a time window. Information about the platoonable task 205 (e.g., manner(s) in which execution of the platoonable task 205 can be distributed or shared among multiple processors, amount of computational resources predicted to be needed for execution of the platoonable task 205, timing of execution of the platoonable task 205, criticality of executing the platoonable task 205 at a particular time, etc.) can be communicated to a task scheduler 230 of the platooning processor 130.

The vehicle tracker 120 can be in communication with the on-board vehicle controllers 225 of the automated vehicles 145, and/or can otherwise determine respective travel paths 215 associated with the OBCPs 150. For example, the travel paths 215 can correspond to a first travel path 215 of a first automated vehicle 145a and a second travel path 215 of a second automated vehicle 145b, where the travel paths 215 may or may not partially differ. In particular, the vehicle tracker 120 can determine the travel paths 215 with respect to predicted locations (or candidate locations) of the automated vehicles 145 during a particular time window.

The task scheduler 230 of the platooning processor 130 can identify the second OBCP 150b as predicted to have available computational resources 210b during at least a portion of the time window. Also, based on the vehicle paths 215, the platooning processor 130 (e.g., a vehicle scheduler 220 of the platooning processor 130) can determine that the second OBCP 150b is located in an associated automated vehicle 145 that is predicted to travel along a travel path 215 during at least a portion of the time window so as to be in ad hoc networking range of the first OBCP 150a during at least the portion of the time window.

According to the above, cases can arise in which the platooning system 200 detects an impending platoonable task 205 of the first OBCP 150a, as well as availability of a second OBCP 150b that will likely have available computational resources 210 and will likely be in a suitable location at a suitable time for distributing execution of the platoonable task 205 among those (e.g., and potentially additional) OBCPs 150. In response to detecting such a case, the task scheduler 230 can schedule platooning of the computational resources 210 of the first and second OBCPs 150 to perform the platoonable task 205. The task scheduler 230 can then instruct performance of the platoonable task 205 by the first and second OBCPs 150 in accordance with the scheduling. In some embodiments, the vehicle scheduler 220 of the platooning processor 130 can direct the on-board vehicle controllers 225 to further optimize the scheduling. For example, the vehicle scheduler 220 can direct one or more automated vehicles 145 to select a travel path that will place it in proximity to one or more other automated vehicles 145 during the time window, to travel along a path that will cause it to stay in close proximity to one or more other automated vehicles 145 (e.g., to stay directly in front or behind another vehicle, to stay in an adjacent lane, etc.), etc.

As described herein, embodiments of the platooning system 200 can be implemented in one or more OBCPs 150 and/or in one or more back-end computational systems 160. Depending on the implementation, different types of data may be exchanged, and or different types of communications may be performed over the network processor 110. In one implementation, the network processor 110, the vehicle tracker 120, and the platooning processor 130 are all implemented in a back-end computational system 160. In such an implementation, data regarding vehicle locations and/or travel paths 215, computational resources 210, platoonable tasks 205, etc. can be communicated using the network processor 110 via one or more communication network(s) 140. The back-end computational system 160 can then instruct execution of the platoonable tasks 205 (and direct travel of one or more automated vehicles 145, in some implementations) via the network processor 110. In another implementation, each of one or more OBCPs 150 implements the network processor 110, the vehicle tracker 120, and the platooning processor 130. In such an implementation, data regarding vehicle locations and/or travel paths 215, computational resources 210, platoonable tasks 205, etc. can be communicated using the network processor 110 via the ad hoc network to one or more of the automated vehicles 145, including the vehicle in which the first OBCP 150a is located. The first OBCP 150a can then instruct one or more other OBCPs 150 in one or more automated vehicles 145 as to the execution of the platoonable tasks 205 (and direct travel of one or more automated vehicles 145, in some implementations) via its network processor 110. Other implementations can distribute components and related functionality in other ways.

Figure 3:
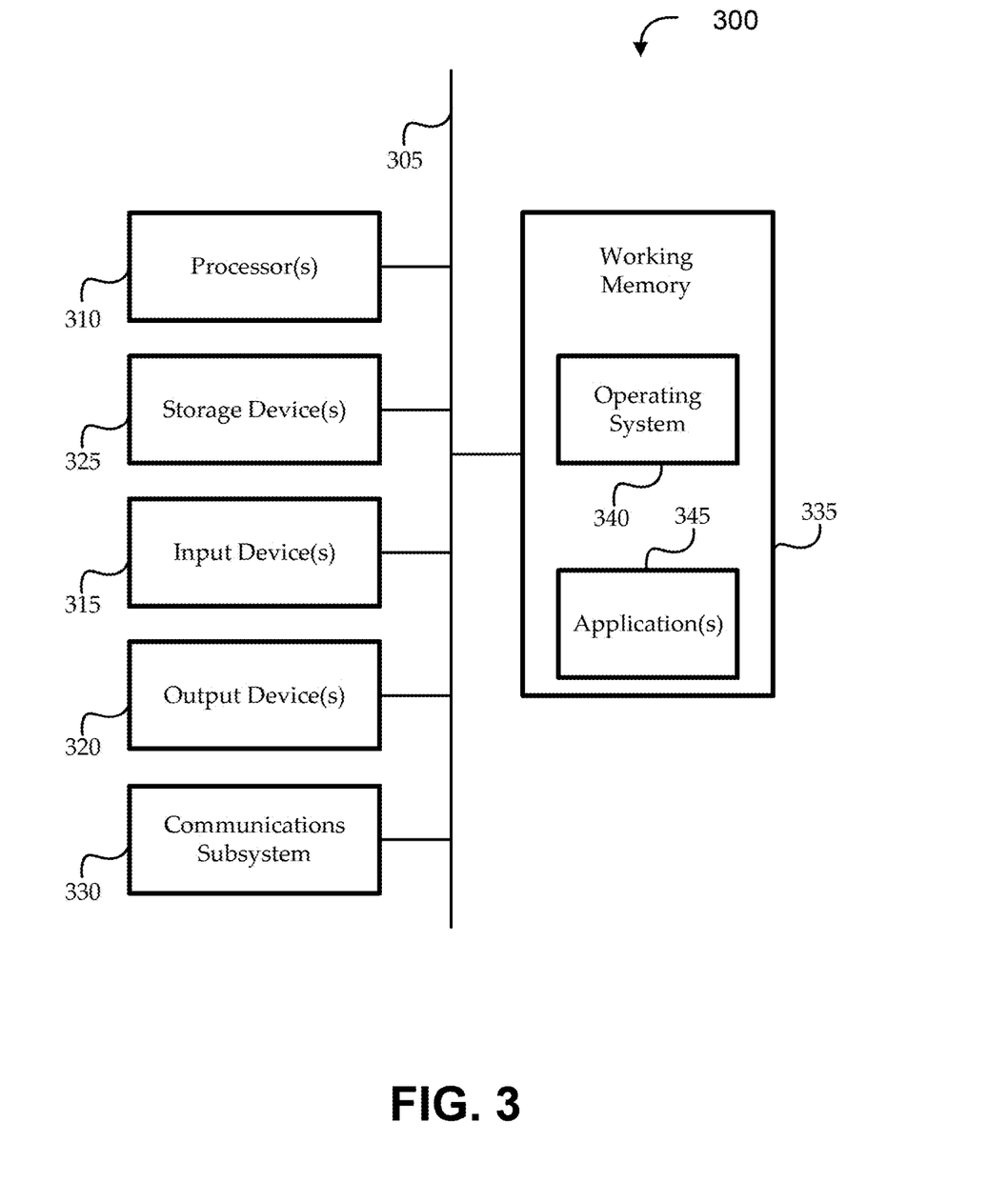
FIG. 3 provides a schematic illustration of one embodiment of a computer system that can implement various system components and/or perform various steps of methods provided by various embodiments.

Embodiments of the platooning system 105, or components thereof, can be implemented on, and/or can incorporate, one or more computer systems, as illustrated in FIG. 3. FIG. 3 provides a schematic illustration of one embodiment of a computer system 300 that can implement various system components and/or perform various steps of methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown including hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, video decoders, and/or the like); one or more input devices 315, which can include, without limitation, a mouse, a keyboard, remote control, touch screen, touch pad, voice input device, and/or the like; and one or more output devices 320, which can include, without limitation, a display device, a data warehouse, a printer, and/or the like.

The computer system 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 300 can also include a communications subsystem 330, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 330 may permit data to be exchanged with a network (such as the various networks described herein), other computer systems, and/or any other devices described herein. In many embodiments, the computer system 300 will further include a working memory 335, which can include a RAM or ROM device, as described herein.

The computer system 300 also can include software elements, shown as currently being located within the working memory 335, including an operating system 340, device drivers, executable libraries, and/or other code, such as one or more application programs 345, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes can be stored on a non-transitory computer-readable storage medium, such as the non-transitory storage device(s) 325 described above. In some cases, the storage medium can be incorporated within a computer system, such as computer system 300. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 300 and/or can take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which can be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 can cause the processor(s) 310 to perform one or more procedures of the methods described herein.

In some embodiments, the computer system 300 implements a system for platooning of computational resources in an automated vehicle network. Such a system can include a network interface to couple with an ad hoc automated vehicle network, one or more processors, and non-transient memory having, stored thereon, instructions, which, when executed, cause the one or more processors to perform steps. The network interface can be implemented, for example, by the communications subsystem 330. The one or more processors can be implemented by processor(s) 310. The instructions can be stored in working memory 335 and executable by the processor(s) 310, for example, to detect a platoonable task as one of multiple computational tasks predicted to consume at least a threshold amount of computational resources of a first computational processor during a time window, the first computational processor disposed in a first automated vehicle; to determine a first travel path along which the first automated vehicle is predicted to travel during the time window; to identify a second computational processor as being located in an associated automated vehicle predicted to travel along a second travel path during at least a portion of the time window so as to be in ad hoc networking range of the first computational processor during at least the portion of the time window, and as predicted to have available computational resources during at least the portion of the time window; to schedule platooning of computational resources of the first computational processor and the second computational processor to perform the platoonable task; and to instruct performance, via the ad hoc automated vehicle network, of the platoonable task by the first computational processor and the second computational processor in accordance with the scheduling.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 300, various computer-readable media can be involved in providing instructions/code to processor(s) 310 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 300.

The communications subsystem 330 (and/or components thereof) generally will receive signals, and the bus 305 then can carry the signals (and/or the data, instructions, etc., carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computer system 300 can be distributed across a network. For example, some processing may be performed in one location using a first processor while other processing may be performed by another processor remote from the first processor. Other components of computer system 300 may be similarly distributed. As such, computer system 300 may be interpreted as a distributed computing system that performs processing in multiple locations. In some instances, computer system 300 may be interpreted as a single computing device, such as a distinct laptop, desktop computer, or the like, depending on the context.

Figure 4:
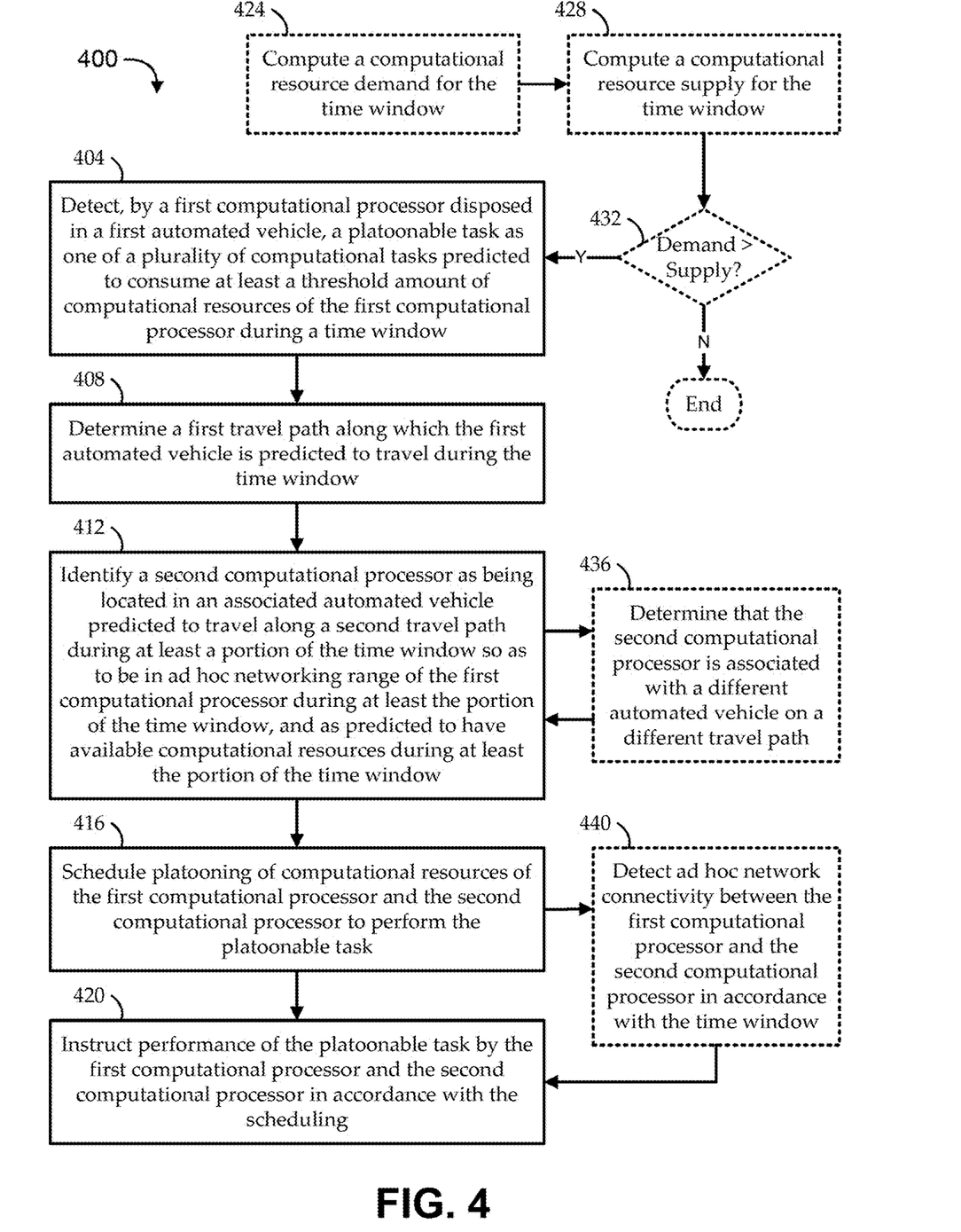
FIG. 4 shows a flow diagram of an illustrative method for platooning of computational resources in automated vehicles networks, according to various embodiments.

Systems including those described above can be used to implement various methods. FIG. 4 shows a flow diagram of an illustrative method 400 for platooning of computational resources in automated vehicle networks, according to various embodiments. Embodiments of the method 400 begin at stage 404 by detecting, by a first computational processor disposed in a first automated vehicle, a platoonable task as one of multiple computational tasks predicted to consume at least a threshold amount of computational resources of the first computational processor during a time window. Some embodiments can begin at stage 424 by computing a computational resource demand for the time window according to an amount of the computational resources of the first computational processor predicted to be consumed by the plurality of computational tasks during the time window. Such embodiments, at stage 428, can compute a computational resource supply for the time window according to an amount of the computational resources of the first computational processor predicted to be available for consumption by the plurality of computational tasks during the time window. In such embodiments, the detecting at stage 404 can be performed responsive to determining that the computational resource demand for the time window exceeds the computational resource supply for the time window. For example, a determination can be made at stage 432 as to whether the computational resource demand for the time window exceeds the computational resource supply for the time window. If so, the method 400 can proceed with the determination at stage 404. If not, the method 400 can end. In some embodiments, stages 424-432 represent a continuous or periodic background routine that is monitoring for a condition in which the computational resource demand for an upcoming time window exceeds the computational resource supply for the upcoming time window, so that the method 400 (e.g., at least stages 404-420) can be performed responsive to detection of such a condition.

At stage 408, embodiments can determine a first travel path along which the first automated vehicle is predicted to travel during the time window. At stage 412, embodiments can identify a second computational processor as being located in an associated automated vehicle predicted to travel along a second travel path during at least a portion of the time window so as to be in ad hoc networking range of the first computational processor during at least the portion of the time window, and as predicted to have available computational resources during at least the portion of the time window. In some embodiments, the identifying at stage 412 includes identifying a set of candidate computational processors as each being associated with a respective automated vehicle predicted to travel along a respective travel path during at least the portion of the time window so as to be in ad hoc networking range of the first computational processor during at least the portion of the time window; and identifying the second computational processor as being one of the set of candidate computational processors predicted to have available computational resources during at least the portion of the time window. Some embodiments of the method 400 further include, at stage 436, determining that the second computational processor is associated with a second automated vehicle different from the first automated vehicle, and that the second travel path is different from the first travel path. In such embodiments, identifying that the a second computational processor is located in the associated automated vehicle predicted to travel along the second travel path during at least the portion of the time window can include determining that the second automated vehicle is predicted to be traveling on a same roadway as the first automated vehicle for at least the portion of the time window.

At stage 416, embodiments can schedule platooning of computational resources of the first computational processor and the second computational processor to perform the platoonable task. In some embodiments, the platoonable task is executable as a plurality of parallel execution threads; and the scheduling at stage 416 includes scheduling a first portion of the plurality of parallel execution threads to be executed by the first computational processor, and scheduling a second portion of the plurality of parallel execution threads to be executed by the second computational processor.

At stage 420, embodiments can instruct performance of the platoonable task by the first computational processor and the second computational processor in accordance with the scheduling. In some embodiments, each of the first computational processor and the second computational processor is coupled with a respective antenna to establish wireless connectivity with an ad hoc network, the ad hoc network having a plurality of member nodes that dynamically changes in accordance with which of a plurality of antennas in proximity to at least another of the plurality of antennas that presently corresponds to a member node of the ad hoc network. In such embodiments, the second computational processor can be predicted to be in ad hoc networking range of the first computational processor during at least the portion of the time window over the ad hoc network, and the instructing at stage 420 can be performed over the ad hoc network (e.g., by communicating instructions via the ad hoc network). In some embodiments, the method 400 further includes, at stage 440, detecting ad hoc network connectivity between the first computational processor and the second computational processor in accordance with the time window. In such embodiments, the instructing can be responsive to the detecting of the ad hoc network connectivity.

As described herein, steps of the method 400 can be performed by any suitable component at any suitable node of a network environment. In some implementations, all of stages 404-420 (e.g., and, in some cases, stages 424-440) are performed by an on-board system of an automated vehicle. For example, the first automated vehicle can perform all of stages 404-420, and stage 420 can involve the first automated vehicle instructing the second automated vehicle over an ad hoc network. In other implementations, all of stages 404-420 (e.g., and, in some cases, stages 424-440) are performed by a back-end computational system. For example, the detecting can involve receiving information at the back-end computational system from the first automated vehicle that indicates detection of the platoonable task at stage 404 and triggers at least stages 408-420; such that stage 420 involves instructing both the first and second computational processors over the ad hoc network. In other implementations, performance of stages 404-420 (e.g., and, in some cases, stages 424-440) can be shared among one or more automated vehicles and one or more back-end computational systems. For example, the first automated vehicle can perform the detecting at stage 404 and the determining at stage 408, and can send information about the platoonable task and the first travel path to the back-end computational system over the ad hoc network, or any other suitable network. The back-end computational system can, in response to receiving that information, perform at least stages 412-420; ultimately instructing both the first and second computational processors over the ad hoc network at stage 420. Other implementations can perform steps of the method 400 in different ways.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for platooning of computational resources in automated vehicle networks, the system comprising:
    a vehicle tracker to:
        determine a first travel path along which a first automated vehicle of a plurality of automated vehicles is predicted to travel during a time window, the first automated vehicle having a first computational processor disposed therein; and
        identify a second automated vehicle of the plurality of automated vehicles as having a second computational processor disposed therein, and as predicted to travel along a second travel path during at least a portion of the time window so as to be in ad hoc networking range of the first computational processor during at least the portion of the time window; and
    a platooning processor to:
        detect a platoonable task as one of a plurality of computational tasks predicted to consume at least a threshold amount of computational resources of the first computational processor during the time window;
        determine that the second computational processor is predicted to have available computational resources during at least the portion of the time window;
        schedule platooning of computational resources of the first computational processor and the second computational processor to perform the platoonable task; and
        instruct performance of the platoonable task by the first computational processor and the second computational processor in accordance with the scheduling.

2. The system of claim 1, further comprising:
    a network processor to:
        communicatively couple, via an ad hoc network, with any of the plurality of automated vehicles in wireless ad hoc networking range of the ad hoc network; and
        communicate instructions to at least one of the first computational processor or the second computational processor via the ad hoc network in accordance with the platooning processor instructing the performance of the platoonable task.

3. The system of claim 2, wherein each of the first computational processor and the second computational processor is coupled with a respective antenna to establish wireless connectivity with the ad hoc network, the ad hoc network having a plurality of member nodes that dynamically changes in accordance with which of a plurality of antennas in proximity to at least another of the plurality of antennas that presently corresponds to a member node of the ad hoc network.

4. The system of claim 2, wherein the network processor is further to:
    detect ad hoc network connectivity between the first computational processor and the second computational processor in accordance with the time window,
    wherein the platooning processor instructs the performance of the platoonable task responsive to the network processor detecting the ad hoc network connectivity.

5. The system of claim 2, further comprising:
    a back-end computational system remote from the first automated vehicle and the second automated vehicle, the back-end computational system comprising the network processor, the platooning processor, and the vehicle tracker.

6. The system of claim 1, wherein the platooning processor is further to:
    compute a computational resource demand for the time window according to an amount of the computational resources of the first computational processor predicted to be consumed by the plurality of computational tasks during the time window; and
    compute a computational resource supply for the time window according to an amount of the computational resources of the first computational processor predicted to be available for consumption by the plurality of computational tasks during the time window,
    such that the platooning processor is to detect the platoonable task responsive to determining that the computational resource demand for the time window exceeds the computational resource supply for the time window.

7. The system of claim 1, wherein:
    the vehicle tracker is further to identify a set of candidate computational processors as each being associated with a respective automated vehicle predicted to travel along a respective travel path during at least the portion of the time window so as to be in ad hoc networking range of the first computational processor during at least the portion of the time window; and
    the platooning processor is to identify the second computational processor as being one of the set of candidate computational processors predicted to have available computational resources during at least the portion of the time window.

8. The system of claim 1, wherein:
    the platoonable task is executable as a plurality of parallel execution threads; and
    the platooning processor is to schedule the platooning by scheduling a first portion of the plurality of parallel execution threads to be executed by the first computational processor, and scheduling a second portion of the plurality of parallel execution threads to be executed by the second computational processor.

9. The system of claim 1, wherein:
    the second automated vehicle is different from the first automated vehicle; and the second travel path is different from the first travel path.

10. The system of claim 1, wherein:
the platooning processor is disposed in the first automated vehicle.

11. The system of claim 1, wherein:
the vehicle tracker is to identify the second automated vehicle as predicted to travel along the second travel path during at least the portion of the time window by identifying that the second travel path is one of a plurality of candidate travel paths determined for travel by the second automated vehicle, and by identifying that the second travel path is the one of the candidate travel paths that causes the second automated vehicle to be in ad hoc networking range of the first computational processor during at least the portion of the time window; and
the vehicle tracker is further to direct the second vehicle to traverse the second travel path in accordance with the platooning processor instructing the performance of the platoonable task.

12. The system of claim 1, wherein:
at least one of the first automated vehicle or the second automated vehicle is a fully autonomous vehicle.

13. A method for platooning of computational resources in automated vehicle networks, the method comprising:
detecting, by a first computational processor disposed in a first automated vehicle, a platoonable task as one of a plurality of computational tasks predicted to consume at least a threshold amount of computational resources of the first computational processor during a time window;
determining a first travel path along which the first automated vehicle is predicted to travel during the time window;
identifying a second computational processor as being located in an associated automated vehicle predicted to travel along a second travel path during at least a portion of the time window so as to be in ad hoc networking range of the first computational processor during at least the portion of the time window, and as predicted to have available computational resources during at least the portion of the time window;
scheduling platooning of computational resources of the first computational processor and the second computational processor to perform the platoonable task; and
instructing performance of the platoonable task by the first computational processor and the second computational processor in accordance with the scheduling.

14. The method of claim 13, further comprising:
computing a computational resource demand for the time window according to an amount of the computational resources of the first computational processor predicted to be consumed by the plurality of computational tasks during the time window; and
computing a computational resource supply for the time window according to an amount of the computational resources of the first computational processor predicted to be available for consumption by the plurality of computational tasks during the time window,
wherein the detecting is performed responsive to determining that the computational resource demand for the time window exceeds the computational resource supply for the time window.

15. The method of claim 13, wherein the identifying comprises:
identifying a set of candidate computational processors as each being associated with a respective automated vehicle predicted to travel along a respective travel path during at least the portion of the time window so as to be in ad hoc networking range of the first computational processor during at least the portion of the time window; and
identifying the second computational processor as being one of the set of candidate computational processors predicted to have available computational resources during at least the portion of the time window.

16. The method of claim 13, wherein:
each of the first computational processor and the second computational processor is coupled with a respective antenna to establish wireless connectivity with an ad hoc network, the ad hoc network having a plurality of member nodes that dynamically changes in accordance with which of a plurality of antennas in proximity to at least another of the plurality of antennas that presently corresponds to a member node of the ad hoc network;
the second computational processor is predicted to be in ad hoc networking range of the first computational processor during at least the portion of the time window over the ad hoc network; and
the instructing is over the ad hoc network.

17. The method of claim 13, further comprising:
detecting ad hoc network connectivity between the first computational processor and the second computational processor in accordance with the time window,
wherein the instructing is responsive to the detecting the ad hoc network connectivity.

18. The method of claim 13, wherein:
the platoonable task is executable as a plurality of parallel execution threads; and
the scheduling comprises scheduling a first portion of the plurality of parallel execution threads to be executed by the first computational processor, and scheduling a second portion of the plurality of parallel execution threads to be executed by the second computational processor.

19. The method of claim 13, further comprising:
determining that the second computational processor is associated with a second automated vehicle different from the first automated vehicle, and that the second travel path is different from the first travel path,
wherein identifying that the a second computational processor is located in the associated automated vehicle predicted to travel along the second travel path during at least the portion of the time window comprises determining that the second automated vehicle is predicted to be traveling on a same roadway as the first automated vehicle for at least the portion of the time window.

20. A system for platooning of computational resources in automated vehicle networks, the system comprising:
a network interface to couple with an ad hoc automated vehicle network;
one or more processors; and
non-transient memory having, stored thereon, instructions, which, when executed, cause the one or more processors to perform steps comprising:
detecting a platoonable task as one of a plurality of computational tasks predicted to consume at least a threshold amount of computational resources of a first computational processor during a time window, the first computational processor disposed in a first automated vehicle;

determining a first travel path along which the first automated vehicle is predicted to travel during the time window;

identifying a second computational processor as being located in an associated automated vehicle predicted to travel along a second travel path during at least a portion of the time window so as to be in ad hoc networking range of the first computational processor during at least the portion of the time window, and as predicted to have available computational resources during at least the portion of the time window;

scheduling platooning of computational resources of the first computational processor and the second computational processor to perform the platoonable task; and instructing performance, via the ad hoc automated vehicle network, of the platoonable task by the first computational processor and the second computational processor in accordance with the scheduling.

\* \* \* \* \*